US008660190B2

(12) United States Patent
    Okada

(10) Patent No.: US 8,660,190 B2
(45) Date of Patent: Feb. 25, 2014

(54) IMAGE PROCESSING APPARATUS IMPLEMENTED IN IC CHIP

(75) Inventor: Shigeyuki Okada, Gifu (JP)

(73) Assignee: Godo Kaisha IP Bridge 1, Tokyo (JP)

( * ) Notice: Subject to any disclaimer, the term of this patent is extended or adjusted under 35 U.S.C. 154(b) by 1868 days.

(21) Appl. No.: 11/436,519

(22) Filed: May 19, 2006

(65) Prior Publication Data

US 2006/0203918 A1    Sep. 14, 2006

Related U.S. Application Data

(62) Division of application No. 10/156,557, filed on May 24, 2002, now Pat. No. 7,065,141.

(30) Foreign Application Priority Data

Jun. 1, 2001    (JP) .................................. 2001-167262

(51) Int. Cl.
    *H04N 7/12*    (2006.01)
    *H04N 11/02*   (2006.01)
    *H04N 11/04*   (2006.01)
    *H04B 1/66*    (2006.01)
    *H04N 5/783*   (2006.01)

(52) U.S. Cl.
    CPC ................................... *H04N 5/783* (2013.01)
    USPC .................................................. 375/240.25

(58) Field of Classification Search
    None
    See application file for complete search history.

(56) References Cited

U.S. PATENT DOCUMENTS

| 4,797,883 | A | | 1/1989 | Kraus |
| 5,694,334 | A | | 12/1997 | Donahue et al. |
| 5,751,888 | A | | 5/1998 | Fukuchi et al. |
| 5,828,383 | A | * | 10/1998 | May et al. ..................... 345/546 |
| 5,856,930 | A | | 1/1999 | Hosono |
| 5,937,138 | A | | 8/1999 | Fukuda et al. |
| 5,943,102 | A | | 8/1999 | Hoshi |
| 6,160,844 | A | | 12/2000 | Wilkinson |
| 6,201,927 | B1 | | 3/2001 | Comer |
| 6,353,700 | B1 | * | 3/2002 | Zhou ............................. 386/353 |
| 6,377,748 | B1 | | 4/2002 | Schultz et al. |

(Continued)

FOREIGN PATENT DOCUMENTS

| JP | 8-032935 | 2/1996 |
| JP | 8-102913 | 4/1996 |

(Continued)

OTHER PUBLICATIONS

Chinese Office Action, w/ English translation thereof, issued in Chinese Patent Application No. 02122053.0, dated Jun. 10, 2005.

(Continued)

*Primary Examiner* — Nhon Diep
(74) *Attorney, Agent, or Firm* — McDermott Will & Emery LLP

(57) ABSTRACT

When a reverse reproduction is instructed, an MPEG video stream is once decoded and is converted to image video signals by a first display circuit. Thereafter, the image video signals are again recoded by an image input circuit and an MPEG video encoder, so as to be overwritten in a storage area of a hard disk. An MPEG video decoder reads out this recoded data sequence in a reverse time-series manner and decodes it successively. Then the thus decoded data are converted to image video signals by a second display circuit, so as to be displayed on a display.

4 Claims, 6 Drawing Sheets

(56) References Cited

U.S. PATENT DOCUMENTS

| | | | |
|---|---|---|---|
| 6,560,282 B2 | 5/2003 | Tahara et al. | |
| 6,707,984 B2 * | 3/2004 | Lin et al. | 386/344 |
| 6,751,400 B1 | 6/2004 | Matsumura et al. | |
| 6,804,402 B2 | 10/2004 | Andrew | |
| 2002/0016963 A1 | 2/2002 | Inoue et al. | |
| 2002/0018638 A1 | 2/2002 | Sparks et al. | |

FOREIGN PATENT DOCUMENTS

| | | |
|---|---|---|
| JP | 8-111870 A | 4/1996 |
| JP | 8-130707 | 5/1996 |
| JP | 7-044428 | 9/1996 |
| JP | 8-166812 | 2/1997 |
| JP | 09-55946 | 2/1997 |
| JP | 10-285047 A | 10/1998 |
| JP | 10-003433 | 7/1999 |
| JP | 11-252507 A | 9/1999 |
| JP | 11-308622 A | 11/1999 |

OTHER PUBLICATIONS

Chinese Office Action, w/ English translation thereof, issued in Chinese Patent Application No. 00818936.6 dated Jun. 18, 2004.

Japanese Notification of Reasons of Refusal, w/ English translation thereof, issued in Japanese Patent Application No. 2001-167262, dated Jan. 6, 2003.

Chinese Notice on Office Action, w/ English translation thereof, issued in Chinese Application No. 02122054.9, dated Sep. 17, 2004.

Japanese Notification of Reasons for Refusal, w/ English translation thereof, issued in Japanese Patent Application No. 2002-152849, dated Jan. 6, 2003.

Chinese Notice on Office Action, w/ English translation thereof, issued in Chinese Application No. 02122065.4, dated Dec. 24, 2004.

Japanese Office Action, w/ partial English translation thereof, issued in Japanese Patent Application No. 2003-370469, dated Oct. 18, 2002.

Japanese Office Action, w/ partial English translation thereof, issued in Japanese Patent Application No. 2000-370517, dated Oct. 18, 2002.

Japanese Office Action, w/ partial English translation thereof, issued in Japanese Patent Application No. 2000-370562, dated Oct. 18, 2002.

Japanese Office Action, w/ partial English translation thereof, issued in Japanese Patent Application No. 2000-370596, dated Oct. 18, 2002.

Japanese Office Action, w/ partial English translation thereof, issued in Japanese Patent Application No. 2000-370622, dated Oct. 18, 2002.

Korean Office Action, w/ English translation thereof only, issued in Korean Patent Application No. 10-2007-7022470, dated Dec. 12, 2008.

Chinese Office Action, w/ English translation thereof, issued in Chinese Patent Application No. 200510079033.0, dated Oct. 17, 2008.

Chinese Office Action, w/ English translation thereof, issued in Chinese Patent Application No. 200510079033.0, dated Mar. 29, 2010.

Chinese Office Action, w/ English translation thereof, issued in Chinese Patent Application No. 200510079033.0, dated Aug. 12, 2010.

Korean Office Action, w/ English translation thereof, issued in Korean Patent Application No. 10-2002-7007706, dated Jan. 29, 2008.

Korean Office Action, w/ English translation thereof, issued in Korean Patent Application No. 10-2007-7022470, dated Jun. 26, 2008.

* cited by examiner

IMAGE PROCESSING APPARATUS IMPLEMENTED IN IC CHIP

RELATED APPLICATIONS

This application is a divisional of application Ser. No. 10/156,557, filed on May 24, 2002, now U.S. Pat. No. 7,065,141 which in turn claims the benefit of Japanese Application No. 2001-167262, filed on Jun. 1, 2001, the disclosures of which Applications are incorporated by reference herein.

BACKGROUND OF THE INVENTION

1. Field of the Invention

The present invention relates to an image processing apparatus. The present invention relates to technology in which to process data coded according to, for example, the MPEG (Moving Picture Expert Group) standards.

2. Description of the Related Art

Information handled in the multimedia is of a vast amount and is multifarious, thus a fast processing of the information is necessary in the course of planning to put the multimedia to practical use. In order to process information at high speed, compression and expansion of data become indispensable. The "MPEG" method is one of data compression and expansion techniques. This MPEG method is being standardized by the MPEG Committee (ISO/IEC JTC1/SC29/WG11) under the ISO (International Organization for Standardization)/IEC (International Electro-technical Commission). An image processing apparatus utilizing the MPEG method is built into various image related devices such as movie camera, still camera, television set, video CD reproduction equipment, DVD reproduction equipment and so forth.

Video data handled in the MPEG relate to moving pictures, and the moving picture is constituted by a plurality of, for example, 30 frames, per second that are still pictures or frames. As shown in FIG. 1, the video data have a hierarchical structure and are comprised of six layers that are a sequence layer, a GOP (group of pictures) layer, a picture layer, a slice layer, a macroblock layer and a block layer in this order. The number of the slices constituting a single picture is not fixed, and the number of the macroblocks constituting a single slice is also not fixed. The macroblock layer and the block layer are omitted in FIG. 1.

Moreover, MPEG is chiefly classified under two methods, namely, MPEG-1 and MPEG-2, according to the coding rates. In MPEG-1, a frame corresponds to a picture. In MPEG-2, however, frames or fields can also be made to correspond to pictures. Two fields constitute one frame. The structure where frames correspond to pictures is called a frame structure, whereas the structure where fields correspond to pictures is called a field structure.

In MPEG, a compression technique called inter-frame prediction is employed. The inter-frame prediction compresses inter-frame data based on a temporal correlation among frames. In the inter-frame prediction, bidirectional prediction is performed. The bidirectional prediction uses both forward prediction for predicting a current reproduced image from a past reproduced image or picture, and backward prediction for predicting a current reproduced image from a future reproduced image.

This bidirectional prediction uses three types of pictures that are I picture (Intra-Picture), P picture (Predictive-Picture) and B picture (Bidirectionally predictive-Picture). An I picture is an image independently produced by an intra-frame coding processing, irrespective of past and future reproduced images. In order for a random access to be performed, at least one I picture is needed within the GOP. All of the macroblock type within the I picture are intra-frame prediction pictures (Intra-Frames). A P picture is produced by the inter-frame coding processing using the forward prediction that is prediction from a past I or P picture. The macroblock type in the P picture includes both an intra-frame prediction picture and a forward prediction picture (Forward Inter Frame).

The B picture is produced by the inter-frame coding processing using the bidirectional prediction. In the bidirectional prediction, a B picture is produced by one of the following three predictions.

(1) Forward Prediction; prediction from a past I picture or P picture.

(2) Backward Prediction; prediction from a future I picture or P picture.

(3) Bidirectional Prediction; prediction from past and future I picture or P picture.

The macroblock type in the B picture includes four types of pictures that are an intra-frame prediction picture, a forward prediction picture, a backward prediction picture (Backward Inter Frame), and an interpolative prediction picture (Interpolative Inter Frame).

These I, P and B pictures are respectively coded. Namely, the I picture can be generated even when no past or future picture is available. In contrast thereto, the P picture can not be generated without the past picture, and the B picture can not be generated without the past or future pictures. However, when the macroblock type is the interpolative prediction picture for the P and B picture, the macroblock is produced even without the past or future pictures.

In the inter-frame prediction, an I picture is periodically produced first. Then, a frame several frames ahead of the I picture is produced as a P picture. This P picture is produced by prediction in one direction from the past to the present, namely, in the forward direction. Thereafter, a frame located before the I picture and after the P picture is produced as a B picture. When producing this B picture, the optimal prediction method is selected from among the three prediction methods which are the forward prediction, backward prediction and bidirectional prediction. In general, a current image and its preceding and succeeding images in consecutive motion pictures are similar to one another, and they differ only partially. Thus, it is assumed that the previous frame and the next frame are substantially the same. If there is a difference between the two frames, that difference only is extracted and compressed. For example, if the previous frame is an I picture and the next frame is a P picture, the difference is extracted as B picture data. Thereby, the inter-frame data can be compressed based on the temporal correlation among frames. A data sequence or a bit stream of video data coded in compliance with the MPEG video part is called an MPEG video stream.

MPEG-1 is designed mainly for storage media such as video CD (Compact Disc) or CD-ROM (CD Read Only Memory). MPEG-2, on the other hand, is designed not only for storage media such as video CD, CD-ROM, DVD (Digital Video Disk) and VTR (Video Tape Recorder) but also for transmission media in general including communication media such as LAN (Local Area Network) and broadcast media such as the ground wave broadcast, satellite broadcast and CATV (Community Antenna Television).

A core of technology used in the MPEG video part lies in a motion compensated prediction (MC) and a discrete cosine transform (DCT). The coding technique combining MC and DCT is called the hybrid coding technique. The DCT (also referred to as a FDCT (forward DCT)) is utilized in the MPEG video part at the time of the coding, so that video signals of the images are decomposed into frequency components so as to be processed. Thereafter, at the time of a decoding, the frequency components are again restored to video signals by using an inverse discrete cosine transform (inverse DCT or IDCT).

The MPEG can process a vast amount of information at high speed and the MPEG uses the compression technique called the inter-frame prediction as described above. Thus, it is extremely difficult to reverse-reproduce a data sequence, for the purpose of a picture search, which is coded and recorded in a time series manner according to the MPEG, namely, it is extremely difficult to reproduce a recorded data series by simply going back along the time axis in the case of reproduction in the reverse direction as in the usual video tape recorder. Thus, it is conventionally performed that I picture alone allotted in each GOP is reproduced by going back along the time axis. Since the I picture is an image produced by the intra-frame coding processing as described above, it can be independently displayed without referring to pictures before and/or after it.

In the conventional examples, the number of the I picture allotted for each GOP is very small. For example, the number of the I picture allotted for each GOP is at most one among pictures constituting the GOP, and when the picture of per 15 to 30 frames is reverse reproduced, a smooth reverse-reproduced picture as in the usual video tape recorder is not obtained, so that it is difficult to stop at a desired scene at a proper timing.

SUMMARY OF THE INVENTION

The present invention has been made in view of foregoing circumstances, and an object thereof is to provide an image processing technique capable of obtaining smooth reverse-reproduced pictures. In order to achieve this object and other objects which will become clear in this patent specification, the present invention intends to solve problems in the technique relating principally to the coding and decoding processing of images.

A preferred embodiment according to the present invention relates to an image processing apparatus. This apparatus is equipped integrally with: a first block including a front-end decoder which decodes a first coded data sequence and a first display circuit which generates an image video signal from data decoded by the front-end decoder; a second block including an image input circuit which converts the image video signal, outputted from the first block, to a video data sequence and an encoder which codes the video data sequence into a second coded data sequence; and a third block including a back-end decoder which decodes the second coded data sequence outputted from the second block and a second display circuit which generates an image video signal from data decoded by the back-end decoder. "Being equipped integrally with" (or mounted together in one body, or being comprised integrally of) here means, for instance, a state in which all the constituent parts are mounted and packaged on a single circuit board such as a mother board. On this circuit board, parts such as integrated circuit (IC) chips and memories are arranged and packaged.

For at least one block of the above-described first block, second block and third block, all components included in the at least one block are mounted as part of a single integrated circuit (IC) chip. Thus a circuit board can be formed using a one-chip LSI. The first block may be, for instance, a video reproducing LSI such as a VGA chip, and the second block may be, for instance, a video recording LSI for use with video capturing and so forth. The third block may also be a video reproducing LSI. The circuit board design utilizing these chips helps raise production efficiency and lower cost.

Another preferred embodiment according to the present invention relates also to an image processing apparatus. This apparatus is comprised integrally of: a first integrated circuit (IC) chip including a front-end decoder which decodes a first coded data sequence and a first display circuit which generates an image video signal from data decoded by the front-end decoder; a second IC chip including an image input circuit which converts the image video signal, outputted from the first IC chip, to a video data sequence and an encoder which codes the video data sequence into a second coded data sequence; and a third IC chip including a back-end decoder which decodes the second coded data sequence outputted from the second IC chip and a second display circuit which generates an image video signal from data decoded by the back-end decoder, wherein the first IC chip, second IC chip and third IC chip are integrally mounted.

Still another preferred embodiment according to the present invention relates also to an image processing apparatus. This apparatus is comprised integrally of: a first block including a front-end decoder which decodes a first coded data sequence and a first display circuit which generates an image video signal from data decoded by the front-end decoder; a second block including an image input circuit which converts the image video signal, outputted from the first block, to a video data sequence and an encoder which codes the video data sequence into a second coded data sequence; and a third block including a back-end decoder which decodes the second coded data sequence outputted from the second block and a second display circuit which generates an image video signal from data decoded by the back-end decoder, wherein the first block, second block and third block are integrally mounted, and wherein all components included in at least the second and third blocks are mounted as part of a single integrated circuit (IC) chip, and both recording and reproduction of image data are processed and controlled by the single IC chip.

Still another preferred embodiment according to the present invention relates also to an image processing apparatus. This apparatus is comprised integrally of: a first block including a front-end decoder which decodes a first coded data sequence and a first display circuit which generates an image video signal from data decoded by the front-end decoder; a second block including an image input circuit which converts the image video signal, outputted from the first block, to a video data sequence and an encoder which codes the video data sequence into a second coded data sequence; and a third block including a back-end decoder which decodes the second coded data sequence outputted from said the second block and a second display circuit which generates an image video signal from data decoded by the back-end decoder, wherein the first block, second block and third block being integrally mounted, and wherein all components included in at least the first and second blocks are mounted as part of a single integrated circuit (IC) chip, and both recording and reproduction of image data are processed and controlled by the single IC chip.

Still another preferred embodiment according to the present invention relates also to an image processing apparatus. This apparatus is comprised integrally of: a first block including a front-end decoder which decodes a first coded data sequence and a first display circuit which generates an image video signal from data decoded by the front-end decoder; a second block including an image input circuit which converts the image video signal, outputted from the first block, to a video data sequence and an encoder which codes the video data sequence into a second coded data sequence; and a third block including a back-end decoder which decodes the second coded data sequence outputted from the second block and a second display circuit which generates an image video signal from data decoded by the back-end decoder, wherein the first block, second block and third block are integrally mounted, and wherein all components included in at least the first and third blocks are mounted as part of a single integrated circuit (IC) chip, and reproduction of image data in a plurality of channels is processed and controlled by the single IC chip.

Still another preferred embodiment according to the present invention relates also to an image processing apparatus. This apparatus is comprised integrally of: a decoder which decodes a first coded data sequence; a display circuit which generates an image video signal from data decoded by the decoder; an image input circuit which inputs the image video signal generated by the display circuit and converts the generated image video signal to a video data sequence; and an encoder which codes the converted video data sequence into a second coded data sequence, wherein the decoder, display circuit, image input circuit and encoder are integrally mounted.

Still another preferred embodiment according to the present invention relates also to an image processing apparatus. This apparatus is comprised integrally of: a first block including a front-end decoder which decodes a first coded data sequence in a time series manner and a first display circuit which generates a first image video signal from data decoded by the front-end decoder; a second block including an image input circuit which converts the first image video signal, outputted from the first block, to a video data sequence and an encoder which codes the video data sequence into a second coded data sequence; a third block including a back-end decoder which decodes the second coded data sequence outputted from the second block in a reverse time-series manner and a second display circuit which generates a second image video signal from data decoded by the back-end decoder; and a switching circuit which switches an output of the first image video signal from the first block functioning as forward reproduction and an output of the second image video signal from the third block functioning as reverse reproduction, wherein the first block, second block, third block and switching circuit are integrally mounted, and wherein the first image video signal from the first block are also inputted to the second and third blocks while being outputted as forward reproduction via the switching circuit, so as to form a standby state in preparation for a switching to reverse reproduction.

It is to be noted here that the terms "I picture", "B picture" and "P picture" used in the patent specification correspond to and encompass the concept of "I-VOP (Video Object Plane)", "B-VOP" and "P-VOP", respectively, in MPEG-4.

In any case of the above described, the coding or the decoding, and a processing accompanied by these as the case may be, may be performed in a predetermined unit of group. Moreover, the first coded data sequence in each of the embodiments may be a data sequence coded in compliance with, for instance, the MPEG method. Moreover, different combinations of the above-described arbitrary structural components and processing processes and so forth, as well as expressions, used in the present invention, transferred between a method, an apparatus, a system, a computer program, a recording medium and so forth are still effective as and encompassed by embodiments of the present invention.

Moreover, this summary of the invention does not necessarily describe all necessary features so that the invention may also be sub-combination of these described features.

DETAILED DESCRIPTION OF THE INVENTION

The invention will now be described based on the preferred embodiments, which do not intend to limit the scope of the present invention, but exemplify the invention. All of the features and the combination thereof described in the embodiment are hot necessarily essential to the invention.

The processings common to some of the embodiments are forward image reproduction and reverse image reproduction. For the convenience of description, "forward" and "reverse" and their synonyms in the following description should be understood to apply to the order when pictures comprising an image are finally put in a form for display. Hence, unless otherwise indicated, the order of pictures represents the state of display.

As will be described later, even in reverse reproduction, the pictures in each GOP of an MPEG data stream are first decoded in the forward direction, namely, in a time series manner. They are recoded and the reverse order is realized for the first time at a stage of a subsequent redecoding. Thus, "reverse" in reverse reproduction concerns mainly a second decoding. The MPEG bit stream may be realized in a variety of combinations in terms of the order of I, P and B pictures.

Various component members appear in the following embodiments. In terms of hardware, those embodiments can be realized by a CPU, memory and other LSIs and combined circuit. In terms of software, they are realized by memory-loaded programs or the like with image processing functions. The following description mainly concerns functions that are realized in cooperation with such components. Therefore, it should be understood by those skilled in the art that these functions can be realized in a variety of forms by hardware only, software only or by the combination thereof. An image reproduction apparatus is an example of an "image processing apparatus" according to the present invention.

First Embodiment

Figure 1:
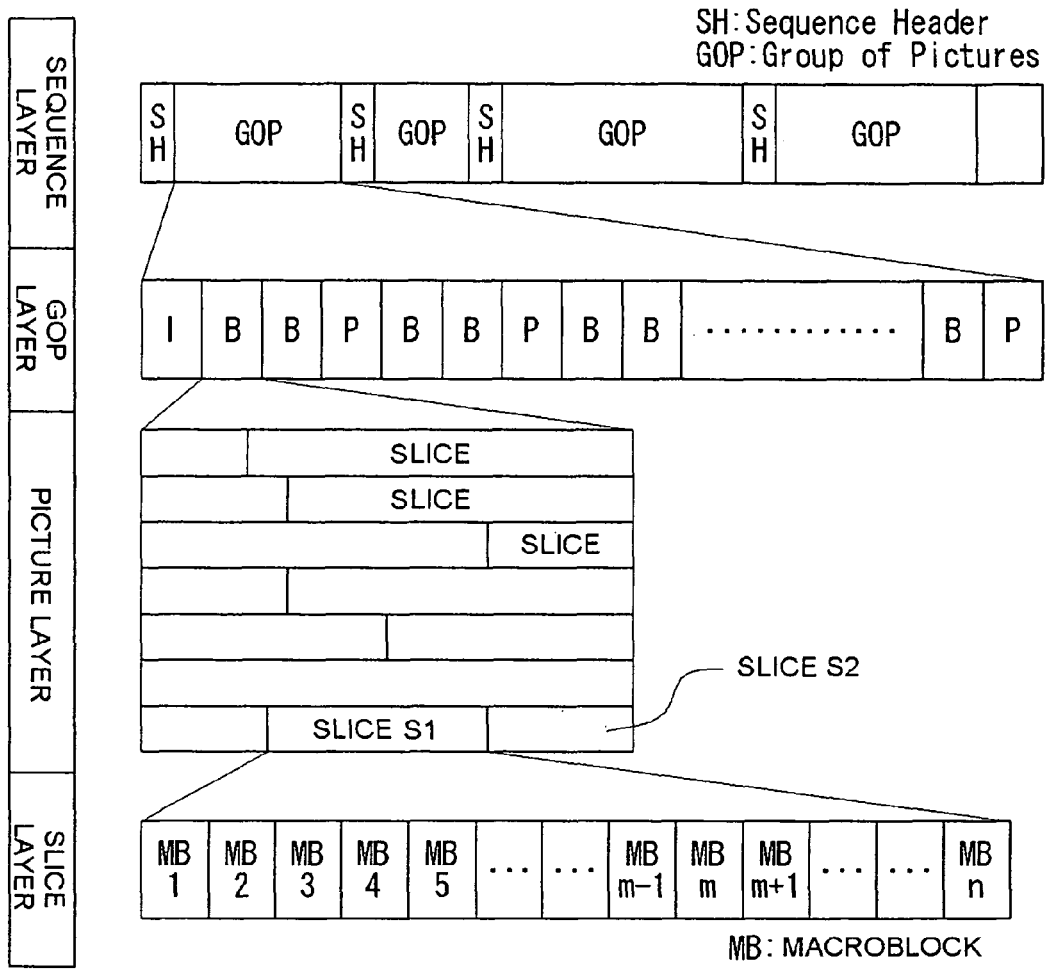
FIG. 1 shows a hierarchical structure of an MPEG video stream.
Figure 2:
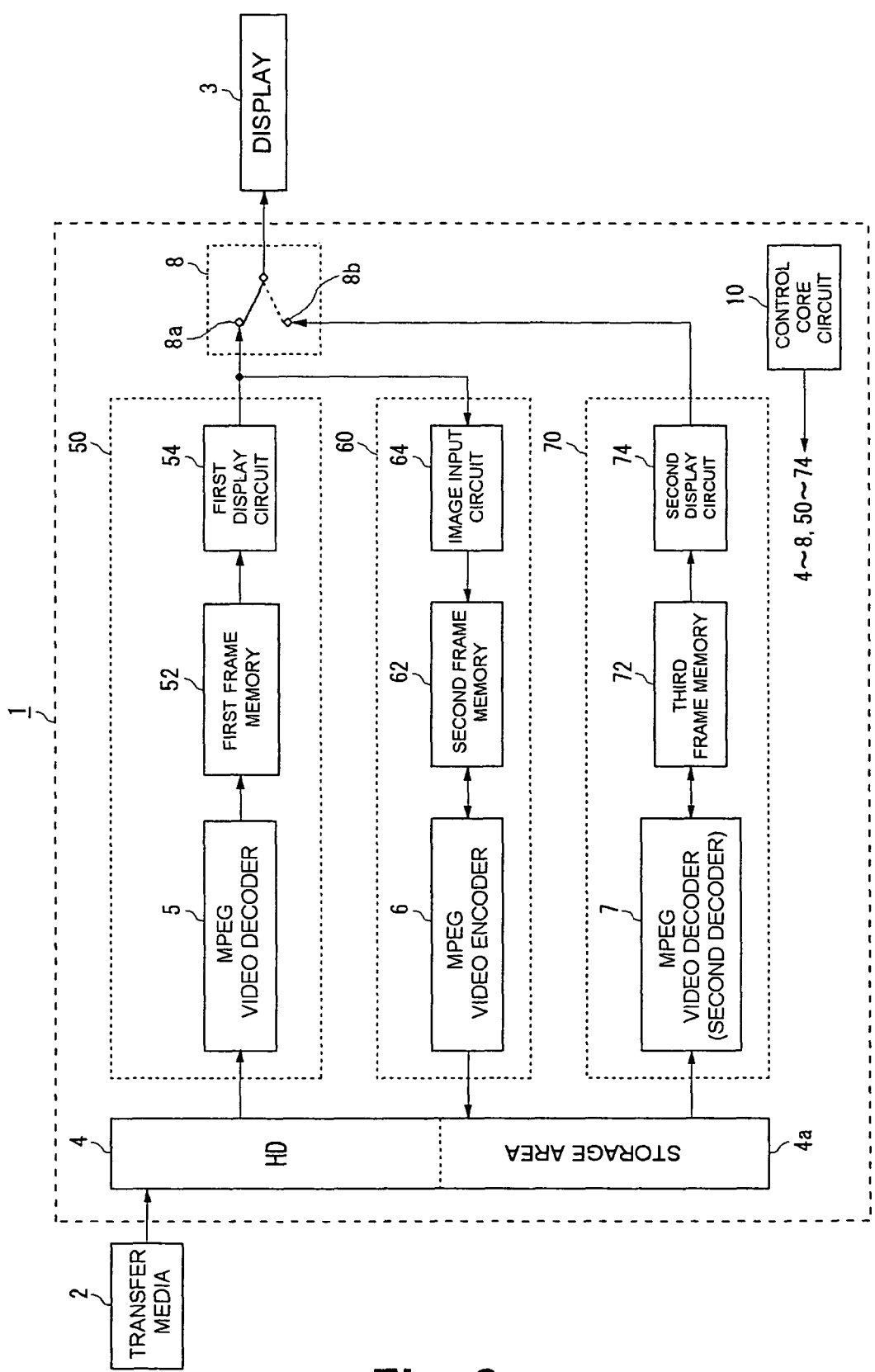
FIG. 2 shows a block circuit diagram of an image reproducing apparatus according to a first embodiment.

FIG. 2 shows a block circuit of an image reproducing apparatus 1 according to a first embodiment. This image reproducing apparatus 1 is incorporated into a movie camera, a still camera, a television, a video CD reproduction apparatus, a DVD reproduction apparatus or the like, which outputs the MPEG video stream from a transfer medium 2 to a display 3. The transfer medium 2 includes storage medium (video CD, CD-ROM, DVD, VTR and so forth), communication medium (LAN and so forth) and broadcasting medium (ground wave broadcasting, satellite broadcasting, CATV and so forth). Moreover, when the data from a storage medium or broadcasting medium are the data which are not coded according to the MPEG video part, the transfer medium also includes an MPEG video encoder which carries out the coding of the digital data. When the image reproducing apparatus 1 is incorporated into a movie camera or a still camera, the transfer medium 2 is replaced by an image pickup device, such as a CCD, and its signal processing circuit.

In FIG. 2, the image reproducing apparatus 1 comprises a hard disk (HD) 4, an MPEG video decoder 5 (hereinafter referred to simply as a "decoder 5" also), an MPEG video encoder 6 (hereinafter referred to simply as an "encoder 6" also), a second MPEG video decoder 7 (hereinafter referred to simply as a "second decoder 7" also), a first frame memory 52, a second frame memory 62, a third frame memory 72, a first display circuit 54, an image input circuit 64, a second display circuit 74, a switching circuit 8 and a control core circuit 10. The control core circuit 10 controls the operation of the decoder 5, the second decoder 7, the encoder 6 and each component of the image reproducing apparatus 1. The hard disk 4, which is comprised of a magnetic disk, stores the video stream transferred from the transfer medium 2 successively. The hard disk 4 is provided with a special storage area 4a within it.

The decoder 5, the first frame memory 52 and the first display circuit 54 constitute a first block 50, while the encoder 6, the second frame memory 62 and the image input circuit 64 constitute a second block 60. The second decoder 7, the third frame memory 72 and the second display circuit 74 constitute a third block 70. The whole or major part of the image reproducing apparatus 1 may be mounted on a single LSI chip, and this may be applied to the other embodiments as well. According to this first embodiment, the first block 50, the second block 60 and the third block 70 are each mounted on a single LSI chip. It is to be appreciated, however, that the first frame memory 52, the second frame memory 62 and the third frame memory 72 may each be mounted externally.

A reproduced image data sequence produced by the decoder 5 is stored temporarily in the first frame memory 52 and then inputted to the first display circuit 54 in regular succession. The first frame memory 52 functions as a display buffer. The first display circuit 54 produces image video signals from picture data transferred from the decoder 5 and outputs the image video signals via the switching circuit 8 to the display 3 which is connected to the image reproducing apparatus 1.

The image video signals outputted from the first block 50 are also inputted to the image input circuit 64. The image input circuit 64 converts the image video signals to a video data sequence, and the video data sequence is temporarily stored in the second frame memory 62 and then recoded by the encoder 6 in regular succession. The second frame memory 62 functions as a buffer.

After a coded data sequence outputted from the second block 60 is stored in a storage area 4a, the second decoder 7 reads this out in a reverse time series so as to be redecoded. A redecoded video data sequence is temporarily stored in the third frame memory 72 and then converted to image video signals by the second display circuit 74. The third frame memory 72 functions as a buffer. These image video signals are outputted via the switching circuit 8 to the display 3 which is connected to the image reproducing apparatus 1.

The switching circuit 8 switches its own connection to a first node 8a side or a second node 8b side according to a control by the control core circuit 10. When the switching circuit 8 is connected to the first node 8a side, forward reproduction based on outputs from the first block 50 is performed. When the switching circuit 8 is connected to the second node 8b side, reverse reproduction based on outputs from the third block 70 is performed.

Figure 3:
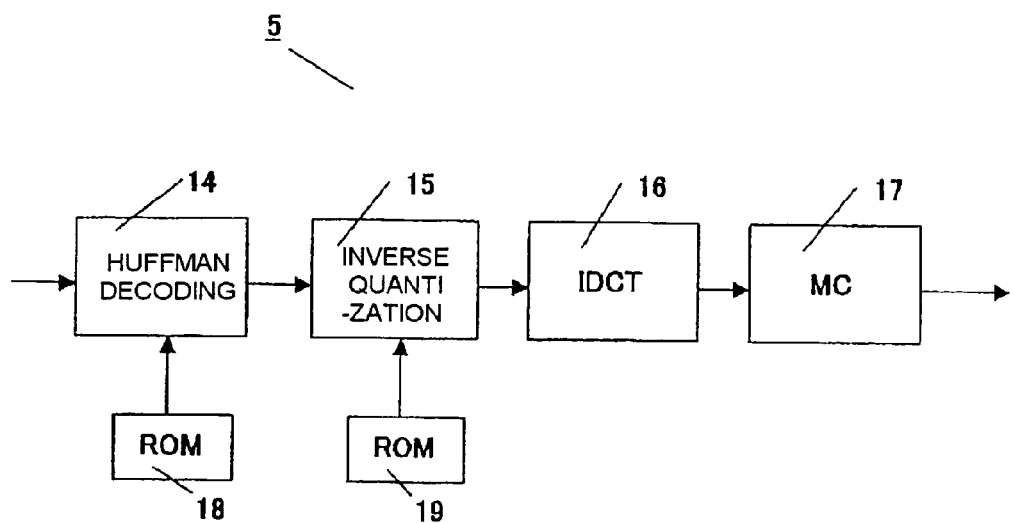
FIG. 3 is a schematic block diagram of a decoder according to the first embodiment.

FIG. 3 is a block diagram showing a structure of the decoder 5. In FIG. 3, the decoder 5 is comprised of a Huffman decoding circuit 14, an inverse quantization circuit 15, an IDCT (Inverse Discrete Cosine Transform) circuit 16, an MC (Motion Compensated prediction) circuit 17 and ROMs (Read Only Memories) 18 and 19. It is to be noted that the decoder 5 is an example of a "front-end decoder" in the present invention.

The Huffman decoding circuit 14 carries out variable-length decoding of the pictures read out from the hard disk 4 according to the Huffman code stored in a Huffman table which is stored in the ROM 18. The inverse quantization circuit 15 obtains a DCT (Discrete Cosine Transform) coefficient by performing an inverse quantization, based on a quantization threshold value stored in a quantization table stored in the ROM 19, on results of a decoding by the Huffman decoding circuit 14. The IDCT circuit 16 carries out an IDCT for the DCT coefficient obtained by the inverse quantization circuit 15. The MC circuit 17 performs an MC (Motion Compensated prediction) on results of a processing by the IDCT circuit 16.

In this manner, the decoder 5 generates a reproduced image data sequence continuous in a time series manner by decoding the inputted MPEG video stream. It is to be noted that the MPEG video stream is an example of a "first coded data sequence" in the present invention.

Figure 4:
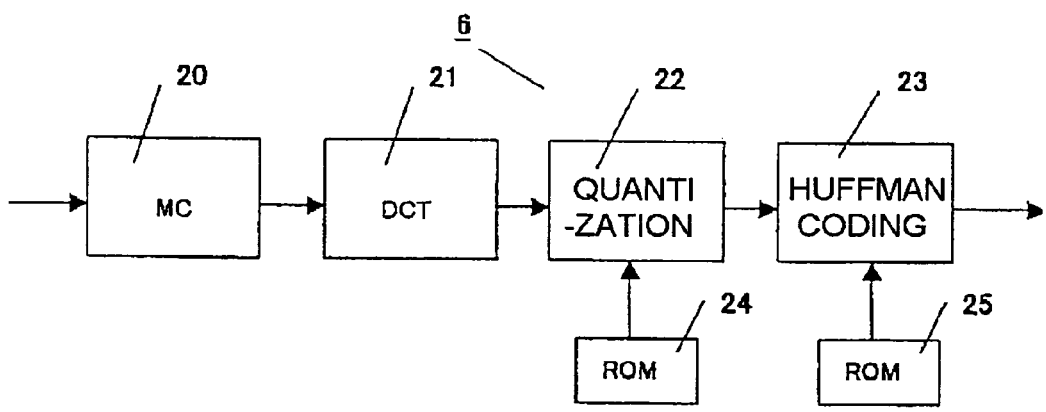
FIG. 4 is a schematic block diagram of an encoder according to the first embodiment.

FIG. 4 is a block diagram showing a structure of the encoder 6. In FIG. 4, the encoder 6 is comprised of an MC circuit 20, a DCT circuit 21, a quantization circuit 22, a Huffman coding circuit 23 and ROMs 24 and 25. It is to be noted that the encoder 6 is an example of an "encoder" in the present invention.

The DCT circuit 21 takes in the reproduced image data inputted from the decoder 5 in units of block and generates a DCT coefficient by carrying out a two-dimensional discrete cosine transform. The quantization circuit 22 performs quantization by referring to a quantization threshold value stored in a quantization table stored in the ROM 24. It is to be noted that the ROM 19 may serve also as the ROM 24.

The Huffman coding circuit 23 generates compressed image data in units of picture by performing a variable-length coding on the quantized DCT coefficient by referring to a Huffman code stored in a Huffman table stored in the ROM 25. It is to be noted that the ROM 18 may serve also as the ROM 25.

In this manner, the encoder 6 generates an MPEG video stream by recoding a reproduced image data sequence continuous in a time series. It is to be noted here that this MPEG video stream is one example of a "second coded data sequence" in the present invention.

Figure 5:
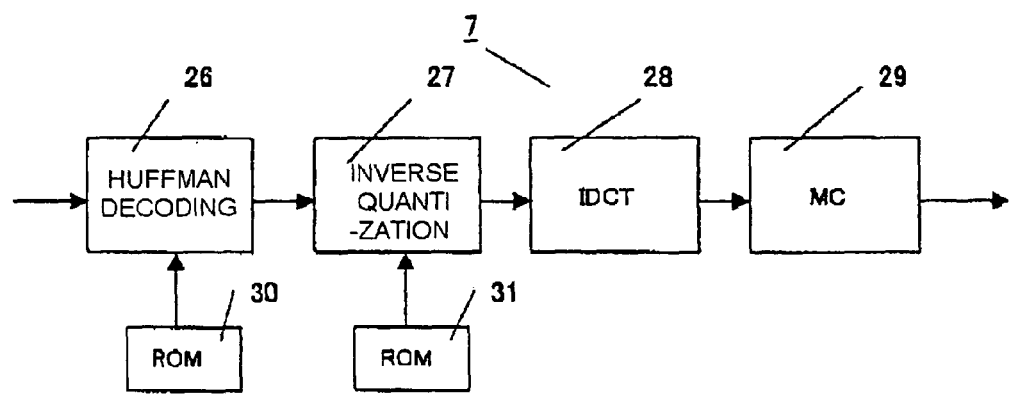
FIG. 5 is a schematic block diagram of a decoder according to the first embodiment.

FIG. 5 is a block diagram showing a structure of the second decoder 7. In FIG. 5, the second decoder 7 is comprised of a Huffman decoding circuit 26, an inverse quantization circuit 27, an IDCT circuit 28, an MC circuit 29 and ROMs 30 and 31. It is to be noted that the second decoder 7 is one example of a "back-end decoder" in the present invention.

This second decoder 7 has a structure similar to that of the decoder 5. Thus, the Huffman decoding circuit 26, the inverse quantization circuit 27, the IDCT circuit 28 and the MC circuit 29 have circuit structures similar to those of the Huffman decoding circuit 14, the inverse quantization circuit 15, the IDCT circuit 16 and the MC circuit 17, respectively. It is to be noted also that the ROM 30 may be used also as the ROM 18 or ROM 25, and the ROM 31 as ROM 19 or ROM 24.

Figure 6:
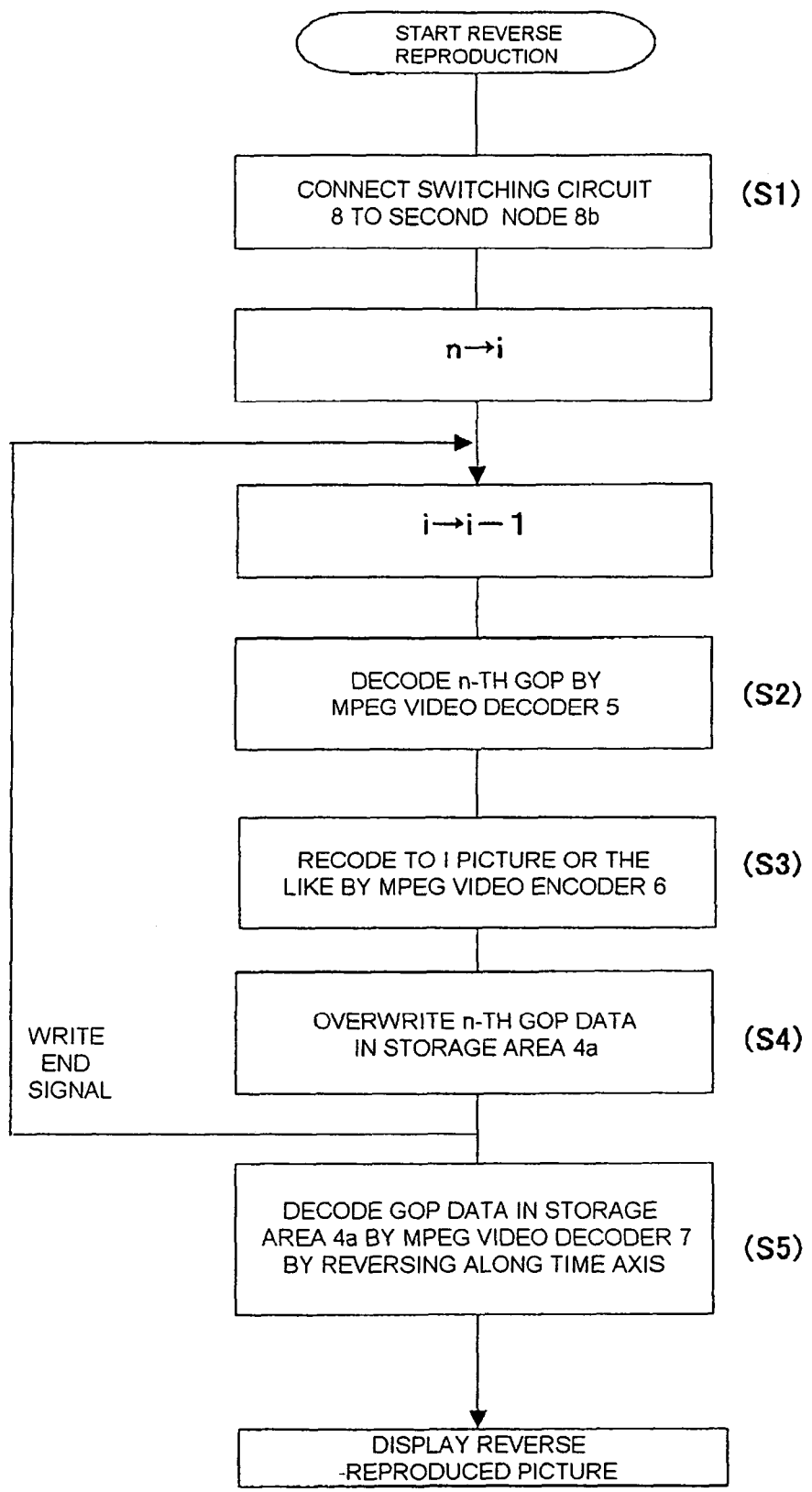
FIG. 6 is a flowchart showing reverse reproduction operations of an image reproducing apparatus according to the first embodiment.

Based on the above-described structures, an operation of reverse reproduction in the image reproducing apparatus 1 according to the present embodiment will be explained, referring to a flowchart shown in FIG. 6. The operation of the image reproducing apparatus 1 is carried out under the control of the control core circuit 10. Here, it is supposed that the MPEG video stream is comprised of i units of GOPs ($GOP_0$ to $GOP_{i-1}$).

In reverse reproduction, each GOP is processed sequentially from $GOP_{i-1}$ by reversing along the time axis. However, the pictures in each GOP are decoded forward, namely, in a time series manner, at the decoder 5. With reverse reproduction instructed, the switching circuit 8 is connected to the second node 8b (S1), an MPEG video stream corresponding to $GOP_{i-1}$ is read out in units of picture from the hard disk 4 and inputted to the decoder 5, and reproduced image data of per picture are generated sequentially in a time series and converted to an image video signal by the first display circuit 54 (S2). This signal is inputted to an encoder 6 in the form of a video data sequence via the image input circuit 64, and then the video data sequence for one GOP is recoded into I pictures or the like (S3). The recoded data sequence for one GOP from the encoder 6 is overwritten in the storage area 4a of the hard disk 4 (S4).

Upon completion of writing in the storage area 4a, the recoded data sequence stored in this storage area 4a is read out in a reverse time-series manner, namely, by going back along the time axis, and then the second decoder 7 decodes this in sequence and the second display circuit 74 converts this decoded sequence to an image video signal. With the end of writing in the storage area 4a, a write end signal is sent out, an MPEG video stream corresponding to a next $GOP_{i-2}$ is inputted to the decoder 5, and the processing from S2 is performed. Namely, in S5, while the data sequence for one GOP is being decoded at the second decoder 7, the data sequence for the next one GOP is being decoded at the decoder 5. The reverse-reproduced pictures are displayed on the display 3.

Figure 7:
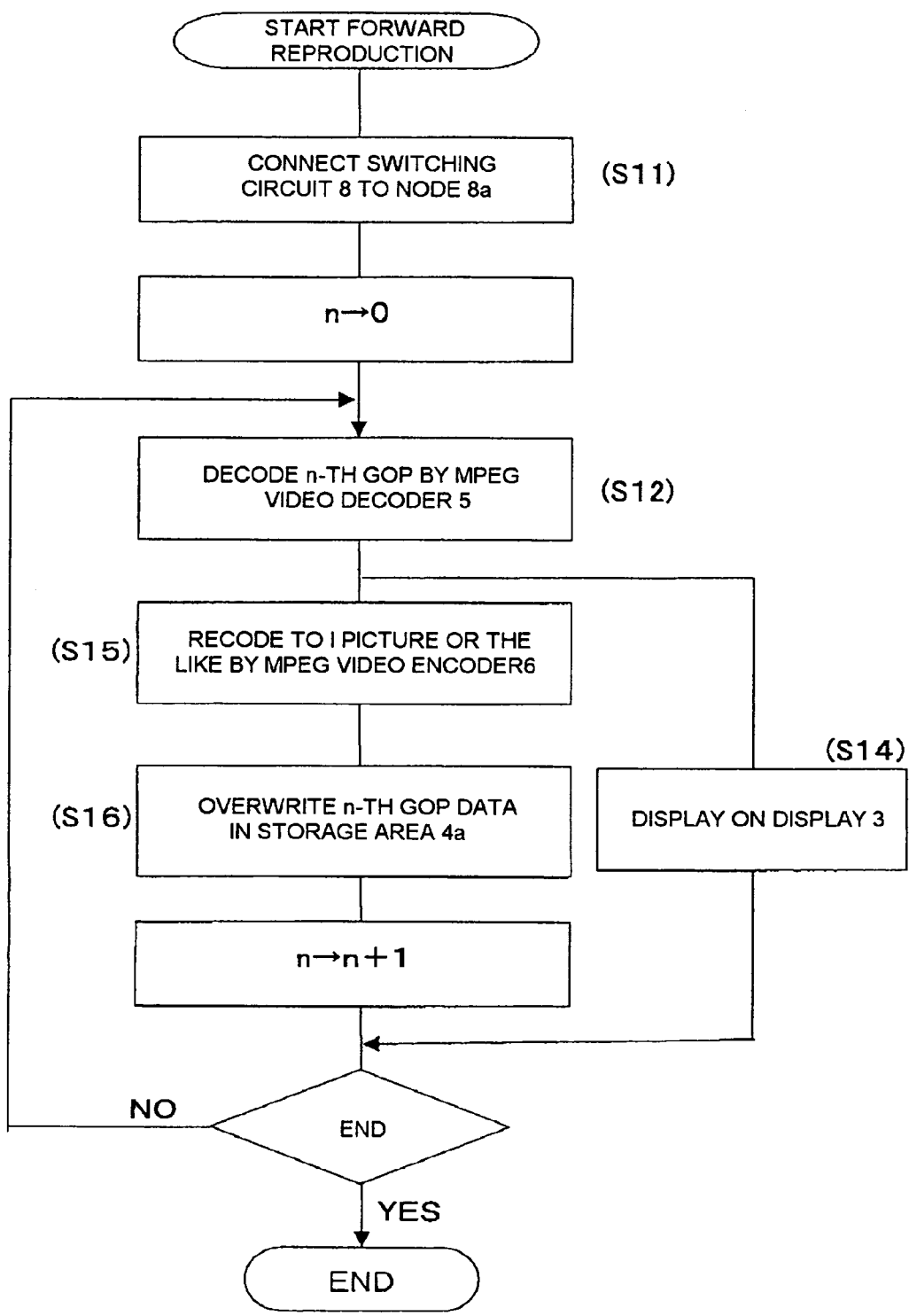
FIG. 7 is a flowchart showing of forward reproduction operations of the image reproducing apparatus according to the first embodiment.

Next, an operation for forward reproduction will be described, referring to a flowchart shown in FIG. 7. In the forward reproduction, data are sequentially processed starting from $GOP_0$ along the time axis. The pictures within each GOP are, of course, decoded in the forward direction at the decoder 5. With forward reproduction instructed, the switching circuit 8 is connected to the first node 8a (S11), an MPEG video stream corresponding to $GOP_0$ is read out picture by picture from the hard disk 4 and inputted to the decoder 5, and the reproduced image data are generated, in units of picture, sequentially in a time series and converted to an image video signal by the first display circuit 54 (S12). This signal is outputted, in parallel, to the second block 60 and the display 3, thereby the forward reproduced picture is displayed on the display 3 (S14).

On the other hand, the encoder 6, in parallel with a processing of the display circuit 9, recodes the reproduced image data sequence, for one GOP, inputted from the decoder 5, into I pictures or the like (S15). The recoded data sequence is overwritten in the storage area 4a of the hard disk 4 (S16). Upon completion of the processing of $GOP_0$, the operation returns again to S12 and the processing of the next $GOP_1$ is carried out. In other words, during forward reproduction, the encoder 6, in parallel therewith, recodes the same image data sequence sequentially in units of GOP into I pictures or the like.

The image reproducing apparatus 1 according to the present embodiment provides the following distinctive operations and advantageous effects:

(1) Where there are a first block 50, a second block 60 and a third block 70, a one-chip LSI can be used for each of them. This helps significantly raise production efficiency and lower cost.

(2) A one-chip LSI can be used for each of portions which correspond to combinations of the second block 60 and the third block 70, the first block 50 and the second block 60, and the first block 50 and the third block 70, respectively. This helps further raise production efficiency and lower cost.

(3) The video data sequence is once converted to analog signals by the first block 50, which are then again turned into data by the second block 60 and recoded. For example, there may be a possible case where relatively high-definition stream data are recorded in the storage area 4a in a slightly deteriorated state in terms of the image quality. Thus, as with the recording of TV broadcast by an ordinary video tape recorder, a measure can be added for copyright protection of the stream data.

(4) While a forward reproduction is carried out, the same image data sequence is being recoded, in parallel therewith, by the encoder 6 into I pictures or the like in units of GOP units. This allows smooth picture switching even when a reverse reproduction is instructed in the middle of a forward reproduction.

Second Embodiment

A second embodiment differs from the first embodiment in that the second block 60 and the third block 70 are structured on a single chip LSI. This single chip is, for instance, an LSI which processes and controls both the recording and reproduction of image data. Likewise, the first block 50 and the second block 60 may be formed by a single chip, or the first block 50 and the third block 70 may be formed by a single chip. In these structures too, the use of single-chip LSIs raises production efficiency and lowers cost.

General Examination and View on the Embodiments

As is naturally understood by those skilled in the art, arbitrary combinations of the embodiments, which have not been described herein, are also possible. For example, the following consideration or modifications are possible:

(a) The encoder 6 codes the inputted video data sequence by motionJPEG which is structured by still pictures in the JPEG format or by motionJPEG2000 which is structured by still pictures in the JPEG2000, instead of by the coded data sequence which is formed by I pictures. In this case, the second decoder 7 decodes this motionJPEG or motionJPEG2000.

(b) Though the first block 50, second block 60 and the third block 70 are respectively structured by single chips in the present embodiments, any arbitrary one or two only of these may be structured by a single chip.

(c) As the hard disk 4, a magneto-optical disk, optical disk or the like is used in place of a magnetic disk.

(d) As the hard disk 4, a rewritable semiconductor memory, such as SDRAM (Synchronous Dynamic RAM), DRAM or Rambus DRAM, is used.

(e) A hard disk 4 and a storage area 4a are provided independently. In this case, the storage area 4a is preferably a rewritable semiconductor memory.

(f) From the MPEG video stream, the data sequence is taken out not in one GOP but in the following units. The following units, including GOP, are included in the concept of units of group.

Units starting from an I picture are not taken as GOP, but the units starting from, for example, a P picture are to be taken as GOP.

Without adhering to the concept of GOP, groups of several pictures are to be units of group.

The number of picture is arbitrarily changed group by group.

(g) RAM (Random Access Memory) is used in place of ROM's 18, 19, 24, 25, 30 and 31.

(h) An operation key to select a reverse reproduction function is provided in the image reproducing apparatus.

(i) Reverse reproduction is carried out frame by frame according to a key operation.

(j) In each of the embodiments described above, pictures included in a recoded data sequence generated by the encoder 6 are written in a time series order into the storage area 4a. However, the data sequence may be written into the storage area 4a while it is rearranged into a reverse time-series order. In this case, the second decoder 7 is not required to read out the recoded data sequence in a reverse time-series manner from the storage area 4a. Moreover, at the time of writing into the storage area 4a, a data sequence, of a B picture, to be front referred may be replaced with a data sequence, of the B picture, to be back referred, or vice versa.

(k) In addition to the above-described embodiments, there are the following modes available as applications in which two coding or decoding functions are provided within a single apparatus. Thus, if there are two encoders provided, those encoders may be put to common use.

(i) A case where in a movie camera a subject is shot simultaneously from different angles and the data thereof are compressed and expanded in the MPEG method.

(ii) A case where in television a plurality of programs are decoded simultaneously and two pictures are displayed on a screen.

(iii) A case where in television a plurality of programs are decoded simultaneously and channel switching is made seamlessly. In the broadcast using MPEG, once the decoding is interrupted for channel switching and the like, a little time, or a period of 0.5 to 2 seconds before a new sequence header is detected, is necessary before the decoding is resumed next. Normally, during this period, the picture freezes or suffers a blackout. (iii) is effective in solving this problem.

(iv) In a television connected with a DVD, digital still camera or the like, the broadcast together with the DVD and digital still camera are reproduced simultaneously.

(v) A case in which, during the reproduction of a program, the program or another program on a different channel is recorded in the state of a moving picture or still picture, and at the same time the recorded moving picture or still picture and the program being broadcast are superimposed and reproduced simultaneously.

(vi) A case in which reproduced images are coded in a JPEG method at certain time intervals and taken into a ring buffer, so that these can be used as an index for a jump to a near scene in a reverse search.

(l) For reverse reproduction, it was necessary that the image data for one GOP be stored, just as they are, in the storage area 4a. This is because the data within a GOP are read out only in the forward direction and thus, without all the data for one GOP remaining, the pictures can not be generated in reverse reproduction. For this reason, it is required that the storage area 4a shall have a capacity for recording the image data for one GOP. Such a structure, however, is put to effective use, so that in the first embodiment and others the encoder 6 is made to run free even during forward reproduction so as to constantly generate and maintain the data for reverse reproduction for one GOP. This arrangement is intended to effect smooth switching from forward to reverse reproduction.

Though this method realizes smoother switching of reproduction directions than when there is no free run, it is not necessarily without a time lag at the switching. This is because when a reverse reproduction is being performed for $GOP_n$, the decoder 5 needs to read out and decode the coded data for one GOP for the preceding $GOP_{n-1}$ and therefore there are possibilities that a series of processings might not be finished before the completion of reverse reproduction of $GOP_n$. Should it not be finished, the reverse reproduction will come to a stop momentarily.

As a countermeasure to this, the time lag at the switching from forward reproduction to reverse reproduction can be eliminated completely by expanding the storage of the image data for one GOP as described in the first embodiment and others and thus by storing the image data for a maximum of about two GOPs. Thus, it suffices to take this countermeasure in a case where such specifications are required.

When the number of pixels is to be reduced, decoding in a down conversion format may be carried out beforehand by the IDCT processing at the decoder 7. Namely, while under the normal circumstances the IDCT processing is performed on the square block of, for example, 8×8 pixels, the IDCT may be performed on 8×4 pixels, that are, the ½ size block. In that case, since the capacity of the image data to be stored in a frame memory in image reproduction becomes ½, the thus emptied area can be used to store pictures for the above-described two GOPs. With this down conversion performed, however, the images of 1960×1080 pixels in high-definition mode will become those of 980×1080 pixels. Thus, in their reproduction, some resolution restoration processing, such as displaying each pixel twice horizontally, is to be carried out.

(m) The above-described time lag at the switching must be taken into account also for the switching from reverse reproduction to forward reproduction. In this case, too, a similar step, namely, storage of read-in picture data for about one to two GOPs, is taken to be able to cope with this case. Suppose that the n-th $GOP_n$ is now being read-in processed for reverse reproduction, then the picture data for this $GOP_n$ are held until the read-out for reverse reproduction reaches $GOP_{n-2}$, which is the GOP two GOPs before it. Namely, uninterrupted reproduction, even at the switching to forward reproduction, is realized by holding certain GOP data until the read-out of the data two GOPs before it.

The switching from reverse reproduction to forward reproduction, which can be handled by the processing at the decoder 5 only, has basically a smaller time lag than the case in (l) above. Thus, it seems that in actual applications, data for a little over one GOP, instead of the data for two GOPs as mentioned here, will suffice. However, it is desirable that this value be determined by experiment or the like on each model because it may vary with equipment implementation.

By implementing the present embodiments according to the present invention, a highly efficient image processing technology by which to carry out very smooth reverse reproduction is provided.

Although the present invention has been described by way of exemplary embodiments, it should be understood that many changes and substitutions may be made by those skilled in the art without departing from the scope of the present invention which is defined by the appended claims.

What is claimed is:

1. An image processing apparatus, comprising integrally:
a first block including: a front-end decoder which decodes a first coded data sequence read from a hard disk; a first frame memory for temporarily storing decoded data; and a first display circuit which generates an image video signal for forward reproduction from data inputted from the first frame memory in succession;

a second block including: an image input circuit which converts the image video signal, outputted from said first block, to a video data sequence; a second frame memory for storing the video data sequence temporarily; and an encoder which codes the video data sequence inputted from the second frame memory in succession into a second coded data sequence and outputs the second coded data to a predetermined storage area in the hard disk; and a third block including: a back-end decoder which decodes the second coded data sequence outputted from the storage area in a reverse time-series manner; a third frame memory for storing decoded data temporarily; and a second display circuit which generates an image video signal for reverse reproduction from data inputted from the third frame memory in succession, wherein the second block generates the second coded data sequence and outputs the second coded data sequence to the storage area in the storage device during forward reproduction.

2. An image processing apparatus according to claim 1, wherein said first block and third block are video reproducing LSIs, and said second block is a video recording LSI.

3. An image processing apparatus according to claim 1, the first coded data sequence is coded in compliance with MPEG.

4. The image processing apparatus according to claim 1, wherein the storage area is an area for storing coded data for 1 group of pictures (GOP) or 2 groups of pictures (GOP).

* * * * *